(12) United States Patent
Pulkkinen et al.

(10) Patent No.: US 7,127,273 B2
(45) Date of Patent: Oct. 24, 2006

(54) REDUCTION SCHEME FOR NETWORK ELEMENTS

(75) Inventors: Jani Pulkkinen, Espoo (FI); Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 388 days.

(21) Appl. No.: 10/114,310

(22) Filed: Apr. 3, 2002

(65) Prior Publication Data

US 2003/0190932 A1    Oct. 9, 2003

(51) Int. Cl.
*H04B 1/38*  (2006.01)
*H04M 1/00*  (2006.01)

(52) U.S. Cl. .................................... 455/561; 455/422.1

(58) Field of Classification Search ................ 455/561, 455/560, 422.1, 7, 14, 15; 375/221, 219
See application file for complete search history.

(56) References Cited

U.S. PATENT DOCUMENTS 5,432,838 A *  7/1995  Purchase et al. ............. 455/523
5,644,622 A *  7/1997  Russell et al. ............ 455/422.1
6,298,098 B1 * 10/2001  Krasner et al. ............. 375/317
6,377,782 B1 *  4/2002  Bishop et al. ............. 455/3.01

\* cited by examiner

*Primary Examiner*—Quochien B. Vuong
*Assistant Examiner*—Lewis West
(74) *Attorney, Agent, or Firm*—Pillsbury Winthrop Shaw Pittman LLP

(57) ABSTRACT

The invention relates to a radio communications system including a base station, a digital exchange, and a transmission system connecting the base station, and the digital exchange. The base station includes an antenna section, an RF receiver section for receiving an RF uplink signal from the antenna section, a mechanism for providing a digitised downconverted uplink signal from the received RF signal, and a mechanism for transferring the digitised down converted uplink signal to the digital exchange through the transmission system. The digital exchange includes a mechanism for receiving the digitised downconverted uplink signal and a mechanism for baseband processing of the digitised downconverted uplink signal.

2 Claims, 3 Drawing Sheets

REDUCTION SCHEME FOR NETWORK ELEMENTS

FIELD OF THE INVENTION

The present invention relates to communications systems, and more particularly to mechanisms for simplifying base station architecture.

BACKGROUND OF THE INVENTION

The TETRA (TErrestrial Trunked RAdio) system is a digital mobile communications system developed primarily for public safety and security, for public trunking operators, and for utilities and industry. A typical TETRA network architecture, as illustrated in FIG. 4, comprises digital exchanges DXT_1, DXT_2 (DXT, Digital Exchange for TETRA) to which base stations TBS_1, TBS_2 (TBS, TETRA Base Station) are connected. HLR (Home Location Register) describes for its part a register of the network where all subscriber parameters of mobile subscribers UE1, UE2 (UE, User Equipment) are permanently stored. VLR (Visited Location Register) describes a register of the mobile network where all subscriber parameters for call set-up are stored as long as mobile subscribers UE1, UE2 are in a location area controlled by this register. In TETRA system VLR registers may be located in connection with exchanges. Reference numeral 1-2 describes e.g. a fixed communications network to which the user UE1, UE2 can be connected via one or more exchanges DXT_1, DXT_2.

A base transceiver station (TBS for TETRA) is the mobile's interface to the network. The station is responsible for radio transmission and reception to or from the mobile station, i.e. to provide the air interface between the radio units and Switching and Management Infrastructure SwMI. The base station converts the digital baseband signals to the radio frequency RF and vice versa. The base station may comprise e.g. transceivers and their power supplies, a combiner, a power divider, a ciphering device and amplifiers.

As can be seen from above many different functions has been given to base transceiver stations. In state of the art network configurations has been like star network configurations with base stations as spatially single entities. This has sometimes lead to problems like unequally divided loads between different parts of the network causing e.g. quality of service to deteriorate at times.

BRIEF DISCLOSURE OF THE INVENTION

An object of the present invention is thus to provide a method and an apparatus for implementing the method so as to solve the above problem. The objects of the invention are achieved by a method and an arrangement, which are characterized by what is stated in the independent claims. The preferred embodiments of the invention are disclosed in the dependent claims.

The invention is based on the idea of replacement of interfaces and equipments between base stations and exchanges with raw data pipes, which just transmit further the data offered from the antenna system of base stations. An advantage of the method and arrangement of the invention is that it enables flexible usage of resources where needed within the area of one digital exchange. Another advantage of the method and arrangement of the invention is that it simplifies base station BS architecture in regard of BS and exchange interfaces.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Regarding the invention, the operation and structure of the TETRA system are described only to a degree that will assist in comprehending the invention and its embodiments. For a more detailed description of the TETRA system, reference is made to the ETSI (European Telecommunications Standards Institute) TETRA specifications that are available at the ETSI home site, www.etsi.org. However, the invention and its embodiments are not TETRA specific, but it will be appreciated that the present invention and its embodiments have application to other system types and may, for example, be applied to in a GSM (Global System for Mobile Communications) digital cellular communication system or to in a UMTS (Universal Mobile Telecommunications System) system.

The purpose of the proposed invention is to reconceptualise the interface between base stations and digital exchanges. Although the invention will be described in connection with a TETRA system, it is not restricted to the TETRA system, but it can be applied in any communications system in which base stations are used.

Figure 1:
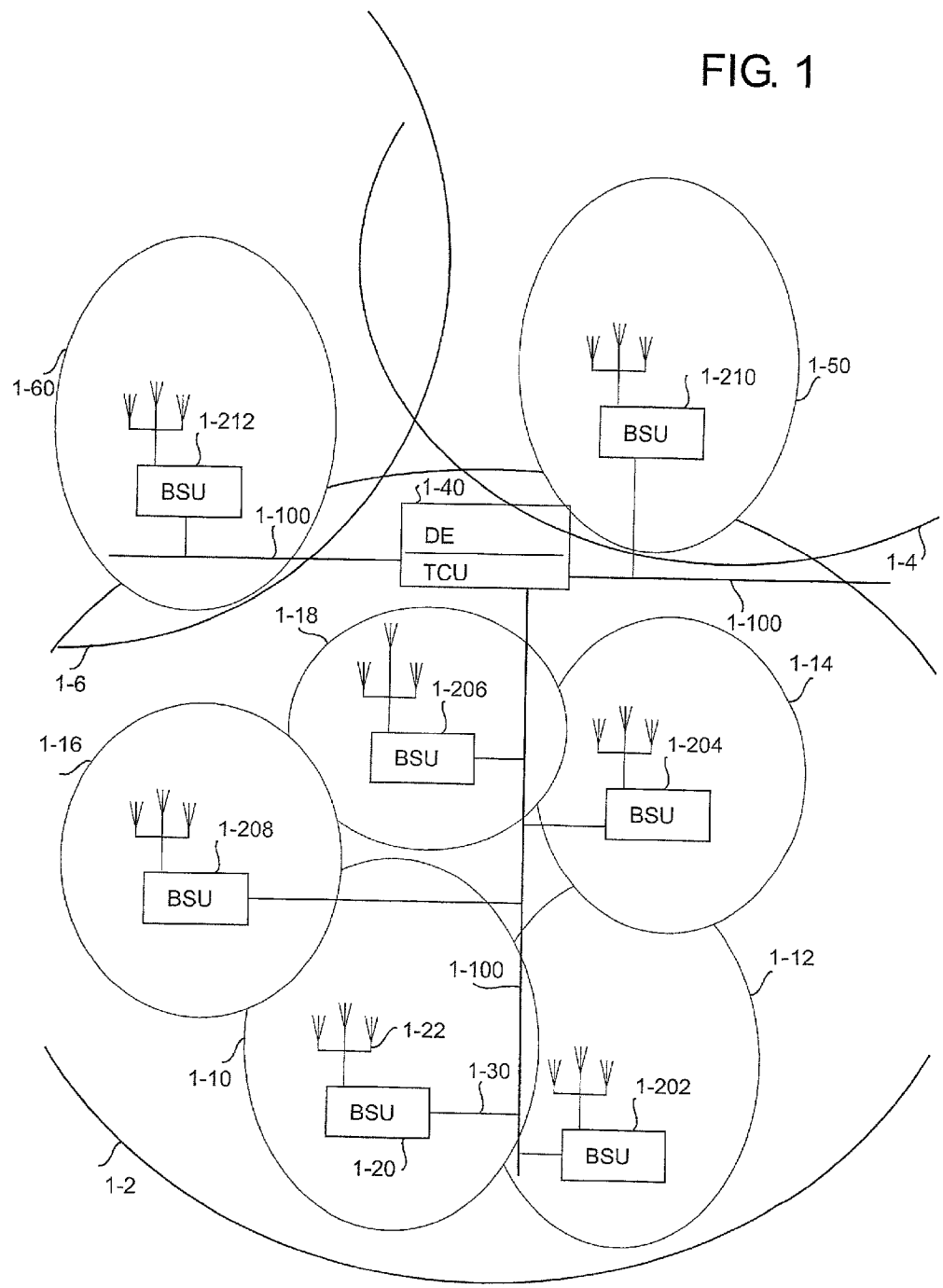
FIG. 1 shows an overall concept of the invention.

FIG. 1 shows an overall architecture concept of the invention. In it a geographical area has been divided into three sectors 1-2, 1-4 and 1-6. A sector can be defined as an abstract coverage area dedicated to separate units, i.e. each of these sectors has a coverage area covered by one or more base station units and antenna systems. Sector 1-2 has coverage areas 1-10, 1-12, 1-14, 1-16, and 1-18. Sector 1-4 has coverage area 1-50 and sector 1-6 has coverage area 1-60. The coverage area 1-10 of sector 1-2 has the base station unit 1-20 and antenna system 1-22. A transmission line 1-30 from the base station unit 1-20 has been connected to main transmission line 1-100.

The basic idea of the invention is to replace base stations with a new configuration where at the site only base station units 1-20 are located. Unlike in usual configurations the base station unit BSU (e.g. 1-20) consists only of some elements of the state of the art base station. Some other elements are transferred to a central unit common for all three sectors as shown in FIG. 1. Elements in the central unit 1-40 comprise a digital exchange DE and a transceiver/controller unit TCU.

Between other parts of the baseband and base station unit is a transmission line, as described above, whose task mainly comprises carrying forward the raw data from base station units, e.g. from 1-20 to the central unit 1-40. Data in the transmission line is in a digital format. Data can also be down converted and decimated, but nothing else is done to data to simplify the connection between different parts of the baseband section and to keep the transmission format as simple as possible. Transmission technique used can be e.g. optical transmission or electrical transmission and the transmission line can be optical fibre or communication cable, correspondingly. Transmission can be packet switched transmission, circuit switched transmission etc.

Figure 2:
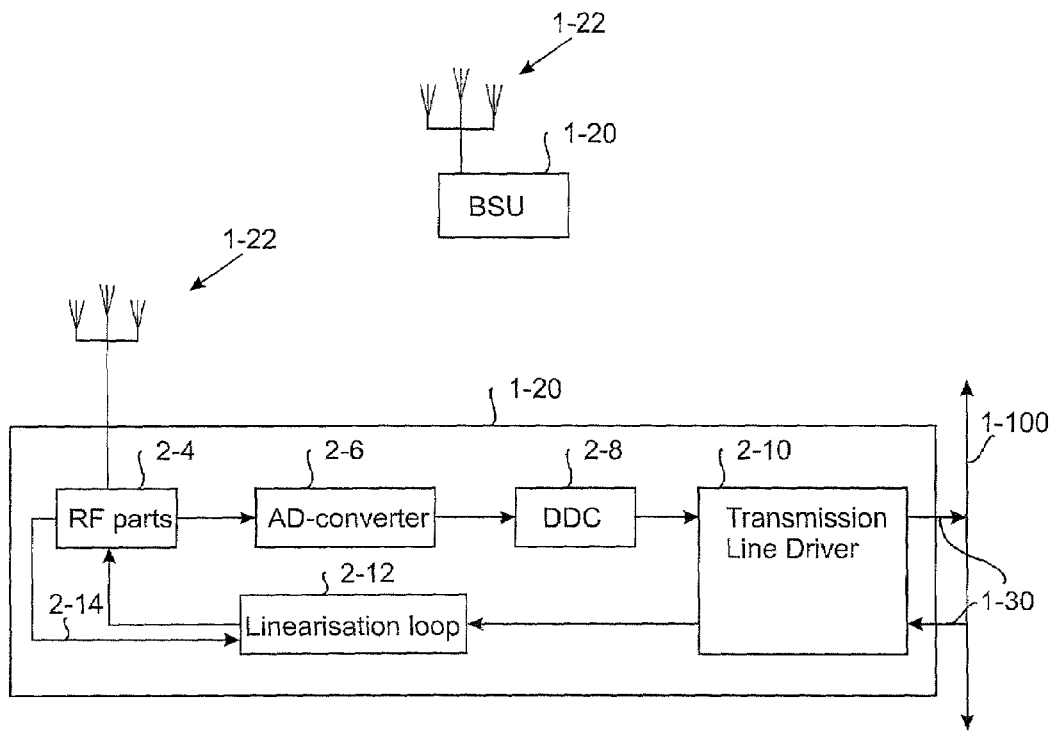
FIG. 2 shows an internal structure of the base station unit.

FIG. 2 shows an internal structure of the base station unit 1-20, a detailed figure of the elements of the coverage area 1-10. The receiver part comprises the antennas 1-22 and RF-parts 2-4 together with an AD-converter 2-6, a digital down converter 2-8 and a transmission line driver, line transmitter 2-10. The digital down converter can comprise a decimation function in order to reduce a data rate. The transmitter part comprises a transmission line driver 2-10, a linearization loop unit 2-12 and RF-parts 2-4.

One purpose of the invention is to make base stations, instead of separate units, ports, which allow data to be forwarded as such from the air interface to the exchange 1-40 as quickly as possible. In other words, it can be thought that the air interface is transferred from the base station to the exchange, or the modular thinking of state of the art is replaced by the centralised way of thinking. This leads to the fact that e.g. the synchronization, as well as other base band processing, can be processed in the exchange instead of processing it in the base station. However, before transferring the data towards the exchange, data can be processed, e.g. down converted to baseband.

Figure 3:
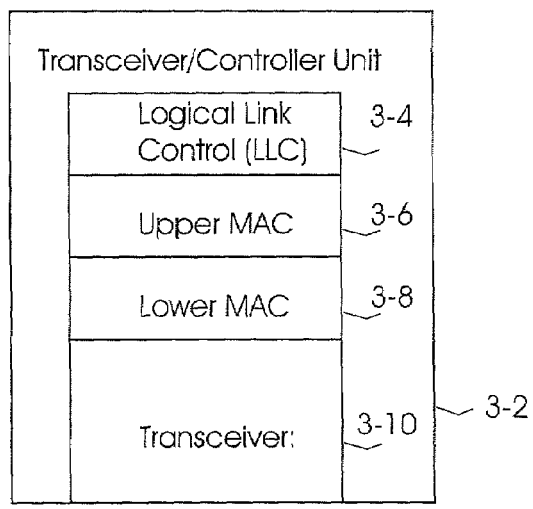
FIG. 3 shows a structure of a transceiver/controller unit.
Figure 4:
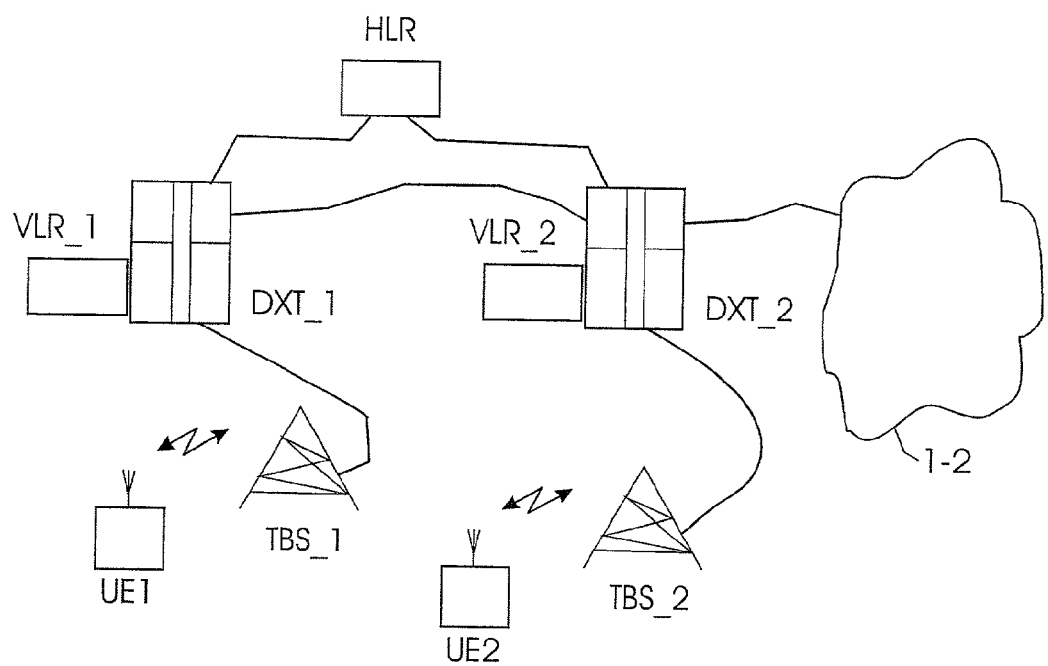
FIG. 4 illustrates an architecture of a typical TETRA system.

FIG. 3 shows a structure of a transceiver/controller unit, TCU. The transceiver/controller unit TCU is a unit, which combines both the functions of the baseband and a base station controller. Transceiver, transmitter-receiver TRX, is a combination of transmitting and receiving equipment in a common housing. The transceiver part and the controller part may form a single unit. TCU has all the capacity to support all traffic inside the areas of base stations connected to the digital exchange. This enables flexible division of loads inside the network. The digital exchange can allocate more processing capacity to those parts of the network, which need it. This can reduce the amount of hardware needed to cover the wanted area compared to state of the art star configuration solution.

However, if the invention and its embodiments are used in state of the art configurations, also then speech delays can be reduced considerably because of one transmission format conversion less than before. Also operational costs can be reduced due to the fact that hardware and functionalities of a network can now be concentrated in the unit 1-40.

The TETRA mobile protocol stack comprise three lowest levels of OSI (Open System Interface) model, namely the physical layer (layer 1), the link layer (layer 2) and the network layer (layer 3). The physical layer is responsible for transfer of bursts, i.e. the transmission of signals and the activation and deactivation of physical connections, and the functions of the layer comprise scrambling, multiplexing of logical channels into bursts, modulation and transmission of symbols over the air interface.

The link layer is responsible for error-free transfer of frames between two stations using bit transfer rate of the physical layer, i.e. synchronisation and some control over the influence of errors within the physical layer. The lower MAC (Medium Access Control) provides functions such as coding, control of radio resources, signal strength measurements and transfer of upper MAC data units by using the physical layer. The upper MAC provides frame synchronization, address management, handling of logical link control messages, access protocols, security issues and radio path establishment and channel management. The logical link control LLC provides data transfer services to network layer.

According to FIG. 3 the transceiver/control unit 3-2 comprises a logical link control LLC 3-4, an upper MAC layer 3-6, a lower MAC layer 3-8, and a transceiver 3-10. MAC may be defined as a local network control protocol that governs mobile station access to a shared transmission medium. The MAC layer is the lower of the two sublayers of the link layer. MAC handles access to shared media so that the transmission path is always available during transmission.

Logical link control is a part of the data link layer that supports the logical link control functions of one or more logical links, including interpreting message packets (Packet Data Unit, PDU) received on a network and generating appropriate response and acknowledgement data appropriate response and acknowledgement data. In GPRS (General Packet Radio System) system in GPRS air interface, the logical link control provides a highly reliable ciphered logical link between the mobile station MS and the SGSN (Serving GPRS Support Node). The logical link control layer can also provide error detection and recovery procedures.

Inside of the base station data is transferred between different layers. According to the invention and its embodiments at least one inner bus is transferred to work as an outer bus towards the exchange. In other words, the data is not transferred inside the base station between two layers but from the base station to the exchange. The protocol stack figure is so to say cut and upper layers are transferred to the exchange.

The best implementation of the invention and its embodiments depends on the radio interface specifications and the properties what the system is wanted to realise. In some cases the most relevant factor is the nature of the radio interface. This means e.g. the division of the air interface to fixed and adaptive frequency ranges and single- and multi carrier options. This has effect on both the transmission side and the receiving side.

The second implementation option is the linearization of the transmitter with several different variations. The third implementation option is the transmission line between base station unit and TCU unit. All these options will be described next.

The fixed frequency range e.g. 400 MHz is easy to arrange, and it can be directly realised as described above. If adaptive frequency range, changing e.g. between 400 MHz and 800 MHz, is needed, the signal from the TCU unit is to be controlled so as to indicate which frequencies are in use together with some logic for controlling receiver and transmitter in the base station unit. This arrangement requires either DSP (Digital Signal Processing) logic or some programmable logic on the base station. Examples from programmable logic comprise FPGA (Field Programmable Gate Array), which are programmable logic device (PLD) containing logic cells or gates that are interconnected through signal channels by programmable switches for which the logic function is defined after manufacturing, and a readjustable mixer.

The second option is to linearize transmitters in order to achieve reasonable performance. This linearization can be realised e.g. by straight RF-feedback (RF, radio frequency) loop or by using more sophisticated structures using e.g. DSP, FGPA or equivalent and digital down-conversion at the feedback loop. Many solutions exist to realise this and the common factor to all of these solutions is the need of additional control and logic and a possible usage of DSP algorithms.

The linearization of the transmitter can require intelligence and digital predistortion on the base station side before entering the bus. A traditional kartesian feedback loop possesses no problem. The purpose is to make the function of the transmitter foreseeable.

The transmission line is located between other parts of the baseband and the base station unit. The only task of the transmission line is to carry forward the raw data from base station units. The data is in a digital format and is down converted and decimated. This arrangement is to simplify the connection between different parts of the baseband. An optional feature for supporting some receiver algorithms, e.g. IRC (Interference Reduction Combining) in diversity receiving and combining, is to sent the data to the transmission line together with a clock signal indicating sampling interval. In relation to transmission bus, feedback loop can be taken into consideration in a function of adaptivity and intelligence.

The used transmission formats can be defined freely, but should be kept simple. No synchronisation clock is needed, because TCU can synchronise itself to the received signal.

When most of the baseband functions are moved from base station units to the digital exchange no complicated interfaces between base station units and the digital exchange are needed. This fact leads to many benefits from the system operation and maintenance point: Loads of the different sectors can be redivided flexible, if loads increase suddenly in some sector; Simplified base station architecture in regard of base station and exchange interfaces; No complex interface between the exchange and the base station; Reduced switching time in the exchange due to smaller amount of transmission format conversions. The interface between the base stations and the exchanges can be realised as fast data buses; Smaller speech delay; The load of different sectors of the network can be divided more equally. This guarantees flexibility in switching of loads between sectors; The proposed concept/system offers more optimised solution to network planning in view of capacity planning; Lower operational costs because network equipments are more concentrated.

It will be obvious to a person skilled in the art that, as the technology advances, the inventive concept can be implemented in various ways. The invention and its embodiments are not limited to the examples described above but may vary within the scope of the claims.

The invention claimed is:

1. A radio communications system, comprising:
a radio access unit;
a digital exchange; and
a transmission system connecting said radio access unit and said digital exchange;
said digital exchange comprising
  a radio controller;
  baseband processing means for providing a modulated multiplexed digital baseband signal from signals of several logical channels; and
  means for sending the modulated multiplexed digital baseband signal to said radio access unit; and
  protocol layer for handling access to a radio interface, whereby said protocol layer is not needed in the radio access unit;
said radio access unit comprising
  means for receiving a modulated multiplexed digital baseband signal from said exchange;
  means for D/A converting said received signal; and
  an RF transmitter section for upconverting the D/A converted signal to an RF signal and transmitting said RF signal,
wherein the transmitter is a transmitter linearized by a straight feedback loop from said exchange to said radio access unit.

2. A radio communications system, comprising:
a radio access unit;
a digital exchange; and
a transmission system connecting said radio access unit and said digital exchange;
said digital exchange comprising
  a radio controller;
  baseband processing means for providing a modulated multiplexed digital baseband signal from signals of several logical channels; and
  means for sending the modulated multiplexed digital baseband signal to said radio access unit; and
  protocol layer for handling access to a radio interface, whereby said protocol layer is not needed in the radio access unit;
said radio access unit comprising
  means for receiving a modulated multiplexed digital baseband signal from said exchange;
  means for D/A converting said received signal; and
  an RF transmitter section for upconverting the D/A converted signal to an RF signal and transmitting said RF signal,
wherein the transmitter is a transmitter linearized by using a DSP processing and/or FPGA device and digital down-conversion at a feedback loop from said exchange to said radio access unit.

* * * * *